Inventor
John D. Spalding
By Lyon & Lyon
Attorneys

Feb. 18, 1936.    J. D. SPALDING    2,031,337
ROTARY SWIVEL
Filed Sept. 12, 1933    2 Sheets-Sheet 2
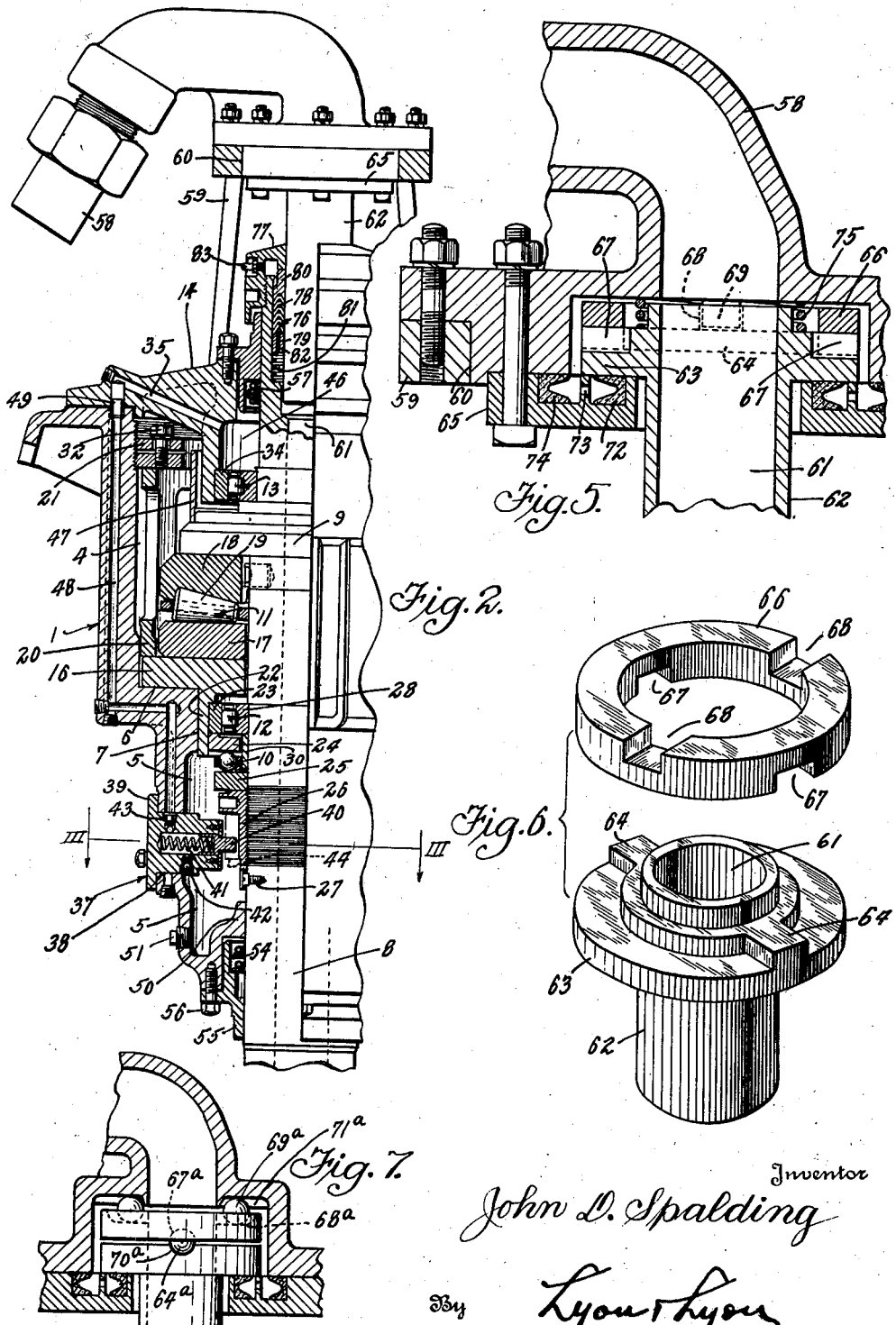
Inventor
John D. Spalding
By Lyon & Lyon
Attorneys Patented Feb. 18, 1936

2,031,337

UNITED STATES PATENT OFFICE 2,031,337

ROTARY SWIVEL

John D. Spalding, Los Angeles, Calif., assignor, by mesne assignments, to The National Superior Company, Toledo, Ohio, a corporation of Delaware Application September 12, 1933, Serial No. 689,074

22 Claims. (Cl. 255—25)

This invention relates to rotary swivels, and more particularly to a rotary swivel of the type employed in connection with the drilling of oil, gas or water wells when in which drilling the rotary process is utilized.

An object of this invention is to provide a swivel including a body, a rotating stem and a bearing assembly for supporting the rotating stem within the body against upthrust and downthrust therein, which bearing assembly is removable with the sleeve as a unit from the body of the swivel.

Another object of this invention is to provide a rotary swivel for use in connection with rotary drilling equipment, including a body, a rotary. swivel and a bearing assembly mounted within the body for rotatably supporting the swivel, and in which swivel the bearing assembly is completely housed enclosed within the body and is mounted within the body in a manner to permit its removal from the body with the rotary sleeve.

Another object of this invention is to provide a rotary swivel adapted for use in connection with drilling equipment which includes a body in which there is rotatably supported a sleeve and in which body there is provided up and down thrust and axial bearings for rotatably supporting and aligning the rotary sleeve, and a means for maintaining a circulation of lubricant to the respective bearings.

Another object of this invention is to provide a rotary swivel in which there is provided a wash pipe supporting means whereby the wash pipe is supported in a manner free to align itself axially with the axis of rotation of the rotary sleeve.

Other objects and advantages of this invention it is believed will be apparent from the following detailed description of a preferred embodiment thereof as illustrated in the accompanying drawings.

In the drawings:

Figure 2 is a fragmental view principally in vertical section taken substantially on the line 2—2 of Figure 1.

Figure 5 is an enlarged fragmental sectional view of a wash pipe mounting within the goose neck embodying my invention.

Figure 6 is a perspective view showing the upper end of the wash pipe and the clutch ring therefor in separated relation.

Figure 7 is a fragmental sectional view of a modified form of wash pipe connection and clutch ring.

Figures 1, 3, 4:
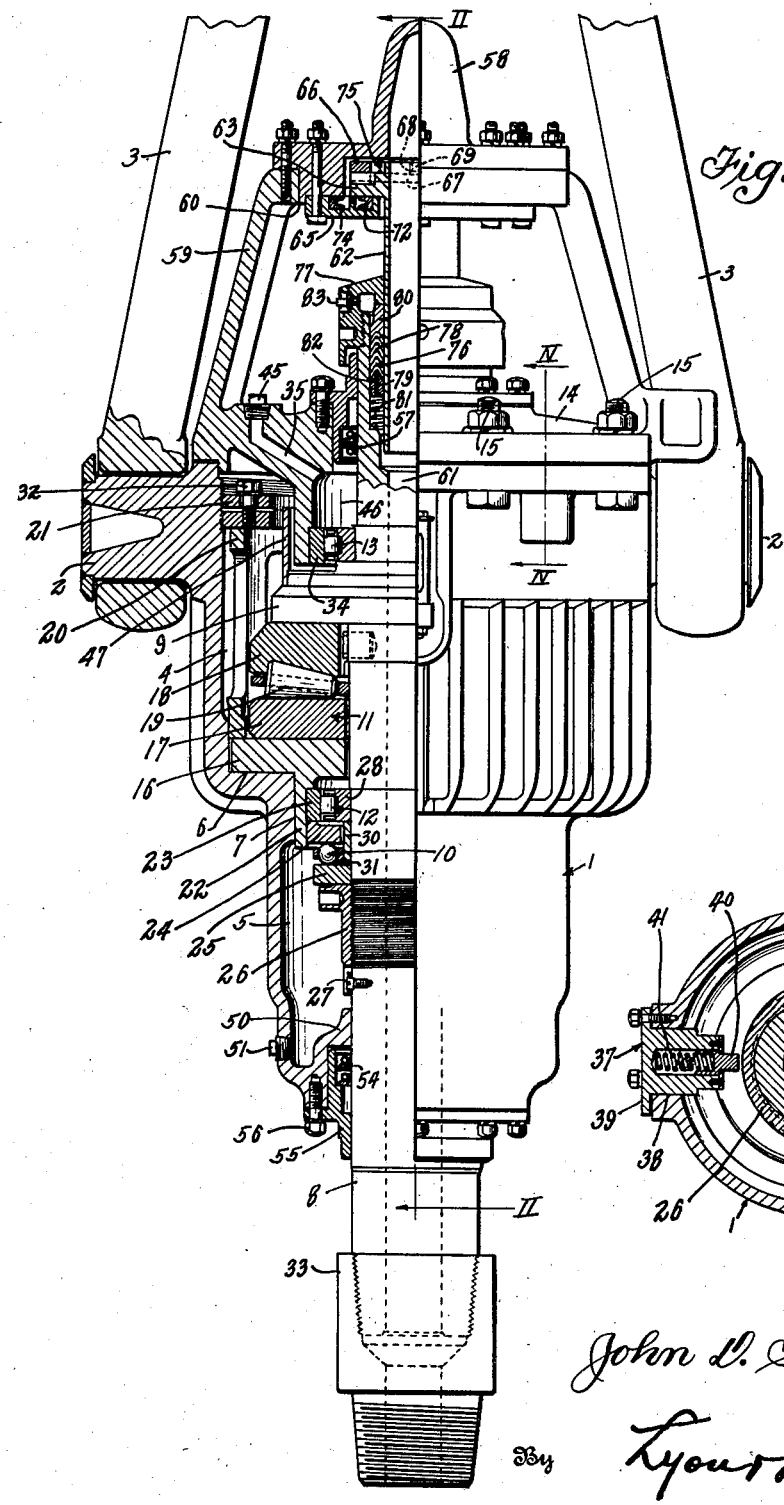
Figure 1 is a side elevation partly in vertical section of a rotary swivel embodying my invention.
Figure 3 is a horizontal sectional view taken substantially on the line 3—3 of Figure 2.
Figure 4 is a fragmental sectional view taken substantially on the line 4—4 of Figure 1.

In the preferred embodiment of my invention illustrated in the accompanying drawings 1 indicates the body of a swivel having radially projected trunnions 2 which fit within eyes formed in the ends of bails 3. The swivel is suspended in a derrick from a hook (not shown) in a manner well known to those skilled in the art. The body 1 is formed to provide an upper chamber 4 and a lower chamber 5. The body is formed to define a shoulder or seat 6 between the chambers 4 and 5 and to provide an axially extending opening 7. A rotary sleeve 8 is rotatably mounted within the body 1 and the rotary sleeve is provided with a flange 9 and is rotatably supported within the body 1 on and by a unitary bearing assembly which preferably includes an upthrust bearing 10, a downthrust bearing 11, and radial bearings 12 and 13. In order to enclose the bearing assembly within the body 1, the body is provided with a cap or cover 14 which is removably secured to the body 1 at its upper portion by means of bolts 15.

In order to provide for the removability of the bearing assembly, there is provided an anchor plate or thrust carrying member 16 which is mounted upon the shoulder formed between the upper and lower chambers 4 and 5 of the body 1 and supports on its upper surface the race rings 17 and 18 of the downthrust bearing 11 between which the bearing members 19 are mounted. It will be obvious that the anchor plate 16 and lower race ring 17 could be formed integral if desired.

In order to hold the anchor plate 16 upon the shoulder formed within the body 1, the anchor sleeve 20 is provided, which anchor sleeve projects upwardly to a point near the upper end of the body 1 and is there held in position by means of a ring 21 which is threaded to the body 1 in position to engage the upper end of the anchor sleeve 20. The anchor plate 16 is provided with a downwardly depending flange 22 which is recessed to receive the race ring 23 of the radial bearing 12 and likewise to receive the race ring 24 of the upthrust bearing 10. The lower race ring 25 of the upthrust bearing 10 is supported upon a collar 26 which is threaded to the rotary sleeve 8 and held in position by a lock screw 27 which engages within any one of a plurality of recesses formed in the end of the collar 26. Interposed between the inner race ring 28 of the radial bearing 12 and the lower race ring 24 of the upthrust bearing 10 is a sleeve member 30.

In order to adjust the bearing clearance for the upthrust bearing 10 and the main supporting bearing 11, shims 31 are provided, the number of which determines the bearing clearance.

In order to lock the anchor plate 16 in position upon the shoulder within the body 1, the anchor ring 21 may be formed as a split ring and locked in position by means of a cap screw 32.

In the construction as thus provided on removal of the cover 14 and the anchor ring 21, the rotary sleeve 8 may be withdrawn from the body together with the bearing assembly so that on the exterior of the structure the bearing clearances may be adjusted or the bearings may be renewed or repaired as may be required. The rotary sleeve is threaded into a rotary drill stem collar 33. The upper radial bearing 13 is supported within the downwardly depending cylindrical portion of the cover 14 within which is retained the outer race ring 34. The outer races 23 and 34 are slightly longer than the rollers in the radial bearing assemblies 12 and 13 and thereby provide at all times a full bearing surface for the rollers, notwithstanding any normal axial movement of the sleeve 8.

In order to insure adequate lubrication of the bearings 10, 11, 12 and 13 as assembled within the enclosure defined by the body 1 and its cover 14, I provide an oil circulating pump 37 which fits within an opening 38 formed in the wall of the body 1 and into the lower chamber 5. The pump 37 includes a flanged housing 39 within which is assembled the plunger 40, a plunger spring 41, a suction valve 42, and a discharge valve 43. The plunger 40 is actuated on the discharge stroke by means of a cam 44 formed upon the depending portion of the collar 26. The suction stroke of the plunger is obtained by means of the compression spring 41 positioned in the cylindrical portion of the housing 39.

This type of construction provides for automatic lubrication or oil circulation when the swivel is in operation with the sleeve 8 rotated, thereby assuring a continuous circulation of lubricant to the bearings as long as the swivel is in operation. Oil is supplied to the swivel through an inlet connection 45 formed in the cover 14, which connection communicates with an annular space 46 above the radial bearing 13. An annular oil enclosure member 47 is secured to the flange portion 9 of the sleeve 8 and surrounds the depending cylindrical portion of the cover 14 to a level slightly above the top level of the radial bearing 13.

The radial bearing 13 is submerged at all times within oil confined within the enclosure 47. In filling the swivel with oil through the connection 45, the oil flows downwardly through the bearing 13 and overflows the top of the enclosure 47 and then flows downwardly through the roller assembly of the main bearing 11 to fill the lower chamber 5.

Oil is normally maintained at a level above the main bearing 13, although all the bearings will be lubricated continuously by the circulated oil in case the oil level should flow below the level of any one of the bearings. The oil from the pump 37 is pumped through a passage 48 formed in the body 1 of the swivel upwardly and into an extension 49 of the passage 48 and into the inlet connection or passage 35 formed in the cover 14, and thence back into the chamber 46. The lower end of the body 1 is provided with an upwardly projecting annular flange 50 to provide a sediment trap at the lower end of the chamber 5 which will collect metal particles and foreign matter which may settle out of the oil. This trap may be drained through the opening having a drain plug 51.

Formed in the upper end of the body 1 as illustrated in Figure 4 is a breather passage 52 within which there is mounted an air strainer 53 for the purpose of allowing air to expand and contract within the oil enclosure without allowing dust and the like to enter the enclosure.

In order to maintain the oil within the body 1 and likewise to prevent the admission of foreign matter into the bearings, a packing assembly is provided at the lower end of the body 1 including packing 54 which is mounted within a supporting collar 55 secured to the lower end of the body 1 by means of cap screws 56. Similar packing 57 is provided within the cap 14 for packing the cap to the rotary sleeve 8.

In order to connect the rotary stem with a non-rotatably mounted goose neck 58, I prefer to employ the following construction:

The cover 14 is provided with a goose neck and wash pipe support 59 which has an axial opening 60 aligned with the water course 61 formed through the sleeve 8. The goose neck 58 registers with the opening 60 and is bolted to the upper face of the support 59.

The goose neck is connected with a slush circulating pump (not shown) by means of a hose or the like which is fitted to the coupling connection of the goose neck in a manner well understood in the art.

A wash pipe 62 is non-rotatably supported by the goose neck in a manner to permit its independent alignment with the water course 61 of the rotary sleeve 8. The upper end of the wash pipe 62 is formed with an annular flange 63 having a transverse tongue 64 on its upper face. The wash pipe is retained within the opening formed in the end of the goose neck 58 by means of a plate 65 which is bolted to the goose neck. To secure the wash pipe 62 in non-rotative relation with the goose neck 58, and yet permit its free floating, there is provided a clutch ring 66 having a transverse groove 67 on its lower face into which the transverse tongue 64 of the wash pipe 62 is fitted.

Formed on the upper face of the clutch ring 66 and 90° from the groove 67, is a second groove 68 into which the tongue 69 of the goose neck 58 is fitted. The coacting tongues and grooves thus prevent a displacement of the wash pipe 62 in a manner identical to the action obtained with an "Oldham Universal coupling."

In Figure 7, I have illustrated a modified form of the free floating connection in which balls 64ᵃ and 69ᵃ are employed in the transverse grooves 70ᵃ, 67ᵃ, 68ᵃ and 71ᵃ. The wash pipe 62ᵃ and goose neck 58ᵃ are otherwise identical to the construction described in connection with Figures 5 and 6.

In order to make the free floating wash pipe connection fluid-tight, I prefer to provide annular packing 72 in a recess formed in the upper face of the plate 65. The packing 72 is preferably of the pressure expanded type and is expanded from fluid under pressure passing through holes 73 which are in communication with the fluid being pumped under pressure through the wash pipe and goose neck.

The pressure seal between the goose neck and the plate 65 includes the pressure expanded type of packing 74 which functions in the same manner as the packing 72. Any other preferred or desired form of packing may be employed between the abutting faces of the goose neck 58 and the plate 65 instead of using the packing 74. A compression spring 75 can be employed between the goose neck and the wash pipe to insure the latter remaining on the plate 65 when the pressure is relieved.

The lower end of the wash pipe 62 is fixed within a rotary stuffing box 76 which is provided in the upper end of the water course 61. A cap member 77 is screwed to the upper end of the sleeve 8 to retain the packing assembly within the stuffing box. The packing assembly, which is preferably of the pressure seal type, includes a plurality of inverted V-shaped packing rings 78 positioned between the packing base ring 79 and the gland ring 80. A compression spring 81, seated against a shoulder formed by the stuffing box recess, forces the packing base ring 79 to maintain an initial pressure on the packing ring 78 and to also automatically take up the wear in the packing ring. The holes 82 in the ring 79 admit fluid pressure into communication with the packing ring 78.

A lubricant connection is provided at 83 to supply lubricant under pressure to the ring 80 and the other parts forming the packing assembly.

Having fully described my invention, it is to be understood that I do not wish to be limited to the details herein set forth, but my invention is of the full scope of the appended claims.

I claim:

1. In a swivel, the combination of a body, a rotary sleeve mounted to rotate within the body, an anchor plate mounted within the body, an upthrust bearing means between the anchor plate and the rotary sleeve, a downthrust bearing means between the anchor plate and the rotary sleeve, and means for removably supporting the anchor plate within the body against displacement in the direction of the axis of the rotary sleeve.

2. In a rotary swivel, the combination of a body, a cap removably secured to the body, a rotary sleeve rotatably mounted within the body, a bearing assembly for the rotary sleeve housed and enclosed within the body and cap, the bearing assembly including upthrust and downthrust bearings, means on the sleeve whereby the up and down thrust bearings may be adjusted relative to each other on the sleeve independently of the body, and means for supporting the bearings in position within the body so as to permit their removal with the rotary sleeve as a unit, and without disturbing said adjustment.

3. In a rotary swivel, the combination of a body, a rotary sleeve and bearing assembly mounted axially of the body, said assembly including a sleeve, a main supporting bearing mounted within the body and an upthrust bearing for rotatably supporting the sleeve against axial movement in either direction, means on the sleeve whereby the up and down thrust bearings may be adjusted relative to each other on the sleeve independently of the body, means to secure the non-rotating elements of the sleeve and bearing assembly within the body against relative axial displacement, said means being removable to permit withdrawal of the sleeve and bearing assembly from said body as a unit, and without disturbing said adjustment.

4. In a rotary swivel, the combination of a body, a rotary sleeve mounted axially of the body, a main supporting bearing mounted within the body for rotatably supporting the sleeve, an adjustable collar secured to the sleeve within the body, an upthrust bearing mounted upon said collar within the body, means to secure the non-rotating elements of the main and upthrust bearings against axial displacement relative to the body, said means being removable to permit withdrawal of the sleeve with the main and upthrust bearings from the body as a unit.

5. In a rotary swivel, the combination of a body, a rotary sleeve passing axially through said body, a main bearing mounted within the body for rotatably supporting the sleeve, a radial bearing for the sleeve above the main bearing, a radial bearing for the sleeve below the main bearing, means to support said radial bearings in axial alignment with said body, an upthrust bearing mounted within the body below the main bearing, means on said rotary sleeve to support said upthrust bearing, means to secure the non-rotating elements of the main and upthrust bearings against axial displacement relative to the body, said means being removable to permit withdrawal of the sleeve with the main and upthrust bearings from the body as a unit.

6. In a rotary swivel, the combination of a body having an upper chamber and a lower chamber, a rotary sleeve passing axially through said body, means cooperating with the sleeve and the lower end of the body to completely close the lower end of the lower chamber, a cover secured to said body and surrounding said sleeve to enclose the upper chamber to define an enclosure, a main bearing mounted within the upper chamber for rotatably supporting the sleeve, a radial bearing for the sleeve supported by the cover, a radial bearing for the sleeve in the lower chamber, an upthrust bearing mounted within the lower chamber, means on the sleeve to support the upthrust bearing, means independent of the cover and enclosed within one of said chambers to secure the non-rotating elements of the main and upthrust bearings against axial displacement relative to the body, said means being removable in the absence of said cover to permit withdrawal of the sleeve with the main and upthrust bearings from the body as a unit.

7. In a rotary swivel, the combination of a body having a supporting shoulder, a cover secured to said body, a sleeve rotatably positioned axially of and projecting through the body, means cooperating with the sleeve and the body to form a bearing enclosure at one end, a thrust carrying member supported on said shoulder, means to secure said member on said shoulder, a main supporting bearing between the sleeve and the thrust carrying member, and an upthrust bearing between the sleeve and the thrust carrying member, said sleeve, thrust carrying member and bearings being insertable and removable as a unit relative to said body in the absence of the cover.

8. In a rotary swivel, the combination of a body having a supporting shoulder, a cover secured to said body, a sleeve rotatably positioned axially of and projecting through the body, means cooperating with the sleeve and the body to form a bearing enclosure at one end, a thrust carrying member supported on said shoulder, means to secure said member on said shoulder, a main supporting bearing between the sleeve and the thrust carrying member, an upthrust bearing between the sleeve and the thrust carrying member, and means to adjust one of said bearings axially relative to the other, said sleeve, thrust carrying member and bearings being insertable and removable as a unit relative to said body in the absence of the cover.

9. In a rotary swivel, the combination of a body having a supporting shoulder, a cover secured to said body, a sleeve rotatably positioned axially of and projecting through the body, means cooperating with the sleeve and the body to form a bearing enclosure at one end, a thrust carrying member supported on said shoulder, means to secure said member on said shoulder, a main supporting bearing between the sleeve and the thrust carrying member, an upthrust bearing between the sleeve and the thrust carrying member, and means positioned on said sleeve to adjust one of said bearings axially relative to the other, said sleeve, thrust carrying member and bearings being insertable and removable as a unit relative to said body in the absence of the cover.

10. In a rotary swivel, the combination of a body having a supporting shoulder, a cover secured to said body, a sleeve rotatably positioned axially of and projecting through the body, means cooperating with the sleeve and the body to form a bearing enclosure at one end, a radial bearing means for the sleeve within the bearing enclosure, a thrust carrying member supported on said shoulder, means to secure said member on said shoulder, a main supporting bearing between the sleeve and the thrust carrying member, and an upthrust bearing between the sleeve and the thrust carrying member, said sleeve, thrust carrying member and bearings being insertable and removable as a unit relative to said body in the absence of the cover.

11. In a rotary swivel, the combination of a body having a supporting shoulder, a cover secured to said body, a sleeve rotatably positioned axially of and projecting through the body, means cooperating with the sleeve and the body to form a bearing enclosure at one end, a thrust carrying member supported on said shoulder, means to secure said member on said shoulder, a main supporting bearing between the sleeve and the thrust carrying member, an upthrust bearing between the sleeve and the thrust carrying member, and a radial bearing confined circumferentially between the sleeve and the thrust carrying member, said sleeve, thrust carrying member and bearings being insertable and removable as a unit relative to said body in the absence of the cover.

12. In a rotary swivel, the combination of a body having a supporting shoulder, a cover secured to said body, a sleeve rotatably positioned axially of and projecting through the body, means cooperating with the sleeve and the body to form a bearing enclosure at one end, a thrust carrying member supported on said shoulder, a means to secure said member on said shoulder, a main supporting bearing between the sleeve and the thrust carrying member, an upthrust bearing between the sleeve and the thrust carrying member, and a radial bearing for the sleeve positioned axially of the sleeve between the main supporting and upthrust bearings, said sleeve, thrust carrying member and bearings being insertable and removable as a unit relative to said body in the absence of the cover.

13. In a rotary swivel, the combination of a body having a supporting shoulder, a cover secured to said body, a sleeve rotatably positioned axially of and projecting through the body, means cooperating with the sleeve and the body to form a bearing enclosure at one end, a thrust carrying member supported on said shoulder, means accessible with the cover removed to secure said member on said shoulder, a main supporting bearing between the sleeve and the thrust carrying member, and an upthrust bearing between the sleeve and the thrust carrying member, said sleeve, thrust carrying member and bearings being insertable and removable as a unit relative to said body in the absence of the cover.

14. In a rotary swivel, the combination of a body, a cap removably secured to the body, the body and cap defining an enclosure, a rotary sleeve provided with a load carrying shoulder and being rotatably mounted axially of the body, a bearing assembly for the rotary sleeve positioned below said shoulder and enclosed within the enclosure, the bearing assembly including upthrust and main supporting bearings, a removable thrust carrying member included within the bearing assembly, and means for securing the thrust carrying member in position within the enclosure so that upon the release of the latter said means, the bearing assembly may be removed with the rotary sleeve as a unit.

15. In a rotary swivel, the combination of a body, a rotary sleeve rotatably mounted axially of the body, a bearing assembly for the rotary sleeve, the bearing assembly including upthrust and main supporting bearings, a thrust carrying member included within the bearing assembly, means on the sleeve whereby the upthrust and downthrust bearings may be relatively adjusted independently of the body, and means for removably securing the thrust carrying member in position so as to permit removal of the sleeve from the body with the bearing assembly intact as a unit and without disturbing the adjustment of said bearings.

16. In a rotary swivel, the combination of a body, and a cap, the body and cap defining an enclosure, a rotatable sleeve provided with a load carrying shoulder and being rotatably mounted within the enclosure, a bearing assembly for the rotary sleeve housed within the enclosure below the load carrying shoulder, the bearing assembly including upthrust and a main supporting bearing, a thrust carrying member for one of said bearings, means for securing the thrust carrying member within the enclosure so that upon release of the said securing means the rotary sleeve, together with the upthrust and main supporting bearings, may be removed from the body with the rotary sleeve as a unit.

17. In a rotary swivel, the combination of a body, a cap, the cap and body defining an enclosure, a rotatable sleeve rotatably mounted within the enclosure, a load supporting shoulder on the sleeve, a bearing assembly for the rotary sleeve housed within the enclosure below the load supporting shoulder, the bearing assembly including upthrust and a main supporting bearing, a thrust carrying member for one of said bearings, means for securing the thrust carrying member within the enclosure so that upon release of the said securing means the rotary sleeve, together with the upthrust and main supporting bearings, may be removed from the enclosure with the rotary sleeve as a unit, and means on the sleeve whereby the upthrust and main supporting bearings may be relatively adjusted independently of the body so that upon removal of the sleeve from the enclosure the adjustment of the bearings is not disturbed.

18. In a rotary swivel for drilling wells, the combination of a bearing housing including detachably connected upper and lower members, a rotary sleeve assembly positioned in part within said bearing housing, means cooperating with said housing and sleeve assembly to provide a lubricant chamber, said assembly including a rotary sleeve, stationary thrust carrying means, upthrust and downthrust bearing means within said housing, said bearing means being positioned between said sleeve and the stationary thrust carrying means, means for adjusting one of the thrust bearing means axially relative to the other to limit the end play of the sleeve relative to the bearing means preparatory to mounting the rotary sleeve assembly within the bearing housing, and means to secure said stationary thrust carrying means against axial movement within said housing.

19. In a rotary swivel for drilling wells, the combination of a bearing housing including detachably connected upper and lower members, a rotary sleeve assembly positioned in part within said bearing housing, means cooperating with said housing and sleeve assembly to provide a lubricant chamber, said assembly including a rotary sleeve, stationary thrust carrying means, upthrust and downthrust bearing means within said housing, said bearing means being positioned between said sleeve and the stationary thrust carrying means, adjustable means on the sleeve to adjust one of said thrust bearing means axially relative to the other to limit the end play of the sleeve relative to the bearing means preparatory to mounting the rotary sleeve assembly within the bearing housing, and means for securing said stationary thrust carrying means against axial movement within said housing.

20. In a rotary swivel for drilling wells, the combination of a bearing housing including detachably connected upper and lower members, a rotary sleeve assembly positioned in part within said bearing housing, means cooperating with said housing and sleeve assembly to provide a lubricant chamber, said assembly including a rotary sleeve, stationary thrust carrying means, upthrust and downthrust bearing means within said housing, said bearing means being positioned between said sleeve and the stationary thrust carrying means, adjustable means on the sleeve to adjust one of said thrust bearing means axially relative to the other to limit the end play of the sleeve relative to the bearing means preparatory to mounting the rotary sleeve assembly within the bearing housing, spaced radial bearing means for rotatably supporting the sleeve axially of the housing, and means for securing said stationary thrust carrying means against axial movement within said housing.

21. In a rotary swivel for drilling wells, the combination of a bearing housing including detachably connected upper and lower members, a rotary sleeve assembly positioned in part within said bearing housing, means cooperating with said housing and sleeve assembly to provide a lubricant chamber, said assembly including a rotary sleeve, stationary thrust carrying means, upthrust and downthrust bearing means within said housing, said bearing means being positioned between said sleeve and the stationary thrust carrying means, adjustable means on the sleeve to adjust one of said thrust bearing means axially relative to the other to limit the end play of the sleeve relative to the bearing means preparatory to mounting the rotary sleeve assembly within the bearing housing, radial bearing means spaced longitudinally of the sleeve above and below the downthrust bearing means to rotatably support the sleeve axially of the housing, and means for securing said stationary thrust carrying means against axial movement within said housing.

22. In a rotary swivel for drilling wells, the combination of a bearing housing including detachably connected upper and lower members, a rotary sleeve assembly positioned in part within said bearing housing, means cooperating with said housing and sleeve assembly to provide a lubricant chamber, said assembly including a rotary sleeve, stationary thrust carrying means, upthrust and downthrust bearing means within said housing, said bearing means being positioned between said sleeve and the stationary thrust carrying means, adjustable means on the sleeve to adjust one of said thrust bearing means axially relative to the other to limit the end play of the sleeve relative to the bearing means preparatory to mounting the rotary sleeve assembly within the bearing housing, and means accessible with one of said body members removed for securing said stationary thrust carrying means against axial movement within said housing.

JOHN D. SPALDING.